3,532,600
METHOD OF PRODUCING L-ORNITHINE AND L-ISOLEUCINE BY FERMENTATION

Shinji Okumura, Tokyo, and Masao Shibuya, Fumihiro Yoshinaga, and Noboru Katsuya, Kanagawa-ken, Japan, assignors to Ajinomoto Co., Inc., Tokyo, Japan
No Drawing. Continuation-in-part of application Ser. No. 615,892, Feb. 14, 1967. This application May 19, 1969, Ser. No. 825,998
Claims priority, application Japan, Feb. 19, 1966, 41/9,898
Int. Cl. C12d *13/06*
U.S. Cl. 195—29   5 Claims

ABSTRACT OF THE DISCLOSURE

When auxotrophic mutant strains of *Arthrobacter citreus* 23–2A, which require citrulline or arginine for their growth, are cultured on an otherwise conventional medium, L-ornithine accumulates in the medium. When the medium additionally contains α-amino-butyric acid, L-isoleucine also accumulates, and these amino acids may be recovered from the medium.

REFERENCE TO RELATED APPLICATION

This application is a continuation-in-part of our copending application Ser. No. 615,892, filed on Feb. 14, 1967, and now abandoned.

BACKGROUND OF THE INVENTION

This invention relates to the fermentative production of amino acids, and particularly to the preparation of L-ornithine and L-isoleucine.

These amino acids are being employed in medical research and as food additives.

SUMMARY OF THE INVENTION

We have found that all mutant strains of *Arthrobacter citreus* 23–2A (ATCC No. 17775), which require citrulline or arginine for their growth, synthesize L-ornithine in economically useful amounts when cultured aerobically on otherwise conventional culture media which contain citrulline or arginine. The concentration of L-ornithine may become as high as 3 or 4 grams per deciliter.

We have also found that both the parent strain and the afore-described auxotrophic mutant strains produce L-isoleucine if the culture medium additionally contains α-aminobutyric acid.

The mutant strains are readily obtained in a conventional manner by exposing vegetative cells or spores of the parent to ultraviolet light, to X-rays, or to gamma rays, and by screening the irradiated material for its response to arginine or citrulline. Suitable mutant strains have also been obtained by contacting the parent strain with sodium nitrite solution in a well known manner.

DESCRIPTION OF PREFERRED EMBODIMENTS

Except for their content of arginine or citrulline, the culture media employed in our invention may be entirely conventional. They must contain an assimilable carbon source, an assimilable nitrogen source, and the usual minor nutrients. Suitable carbon sources include carbohydrates, such as glucose, fructose, maltose, xylose, starch hydrolyzate, molasses, and organic acids. The concentration of the carbon source in the medium should preferably be controlled to 5–15% glucose equivalent.

A nitrogen source is employed as a nutrient for the propagation of the microorganisms and as a source of amino groups for L-ornithine. Nitrogen may be provided by ammonium salts of inorganic or organic acids, and by ammonia in aqueous solution or in the gaseous state, which may be used simultaneously for pH control in a known manner.

Supplemental inorganic nutrients required include the essential inorganic ions available from potassium phosphate, magnesium sulfate, manganese sulfate, zinc sulfate, ferrous sulfate, sodium chloride and carbonate. Organic growth promoting agents which improve the yield and the rate of production of L-ornithine include vitamins and fatty acids, and may be added to the culture medium in the form of substances which yield the active agent under the conditions of fermentation, such as peptone, yeast extract, corn steep liquor, soybean protein hydrolyzate, and various other extracts of vegetal and animal tissues, well known themselves.

Citrulline or arginine should be present in the culture medium in a preferred concentration of 10 to 100 mg. per deciliter. At lower concentrations, the growth rate of the microorganisms and the rate of L-ornithine production are very low. At higher concentrations, the growth of the microorganisms normally proceeds rapidly, but the rate of L-ornithine production is reduced. If the growth of the microorganisms is restrained by known modifications of the fermentation conditions, an adequate yield of L-ornithine can be obtained at citrulline or arginine concentrations above the preferred range indicated.

It is also necessary to add α-aminobutyric acid to the medium if L-isoleucine is to be formed jointly with L-ornithine in the broth. The concentration of α-aminobutyric acid should be between 0.5 and 3% by weight for good yields of L-ornithine and L-isoleucine. The entire amount of α-aminobutyric acid may be added to the medium at the beginning of the fermentation, or it may be added continuously during the fermentation.

For a good yield of L-ornithine, the fermentation should be carried out with aeration or agitation in order to supply sufficient oxygen to the broth. Best yields of L-ornithine cannot be obtained unless the hydrogen ion concentration in the culture medium is controlled between pH 6 and 8. Aqueous ammonia, calcium carbonate or alkali metal hydroxides may be added to the nutrient medium from time to time, as required to maintain the desired pH range. For best results, the temperature of the broth should be held between 25° and 37° C. during fermentation. The fermentation is normally carried out for less than 80 hours.

The recovery of L-ornithine and L-isoleucine from the nutrient medium may follow known methods. The bacterial cells may be removed by filtration or by centrifuging, and L-ornithine may then be absorbed from the liquid at pH 3.5 on ion exchange resins, and separated from accompanying materials by selective elution. L-isoleucine may also be isolated from the broth by means of ion exchange resins.

The following examples are further illustrative of the invention, but it will be appreciated that the invention is not limited thereto.

Example 1

An aqueous culture medium was prepared to contain 10% sweet-potato starch hydrolyzate (glucose equivalent), 0.1% $KH_2PO_4$, 0.04% $MgSO_4 \cdot 7H_2O$, 2 p.p.m. $Fe^{++}$, 2 p.p.m. $Mn^{++}$, 3 ml./dl. soybean protein hydrolyzate, 500 μg./l. thiamine hydrochloride, and 3% ammonium sulfate. Its pH was adjusted to 7 with aqueous ammonia. 20 milliliter batches of the solution were placed in 500 ml. shaking flasks, and were sterilized by steam in the flasks at 110° C. for 5 minutes. They were then inoculated with a radiation induced mutant of *Arthrobacter citreus* 23–2A requiring arginine for its growth, which had been previously cultured on yeast-peptone agar slants, whereafter 1 gram calcium carbonate was added to the medium and the fermentation was carried out at 31° C.

under shaking for 72 hours. 3.52 grams per deciliter of L-ornithine were found in the broth.

The microbial cells and calcium salts were removed from one liter of the broth by filtration, and the solution was adjusted to pH 2.0 with concentrated hydrochloric acid. The acid solution was passed over a column packed with a cation exchange resin of the ammonium type. The column was washed with water, and the L-ornithine was then eluted with 2 N ammonium hydroxide solution. The eluate was concentrated to 200 ml., adjusted to pH 5.3, and further concentrated to 100 ml.

28.1 g. crystals of crude L-ornithine chloride were precipitated from the solution by cooling. Its purity was 87.8%. In this example, L-arginine was supplied from soybean protein hydrolyzate in which L-arginine hydrochloride was included with an amount of 11 mg./ml. Therefore, 33 mg./dl. of L-arginine hydrochloride were contained in the medium.

Example 2

A culture medium as used in Example 1, but without ammonium sulfate, was prepared. A 250 ml. batch of the solution was placed in a one-liter fermentor, and was sterilized by steam at 110° C. for 5 minutes. It was then inoculated with *Arthrobacter citreus* 23–2A.X–4 (ATCC No. 21040), a radiation-induced arginine requiring mutant of *Arthrobacter citreus* 23–2A, which has been previously cultured on yeast-peptone agar slants, and gaseous ammonia was fed to the culture from time to time in order to control the pH value of the broth at about 7, and to supply nitrogen to the medium. The fermentation was carried out at 31° C. under shaking for 60 hours. 4.05 grams per deciliter of L-ornithine were found in the broth.

Example 3

An aqueous culture medium was prepared to contain 10% sweet-potato starch hydrolyzate (glucose equivalent), 0.1% $KH_2PO_4$, 0.04% $MgSO_4 \cdot 7H_2O$, 2 p.p.m. $Fe^{++}$, 2 p.p.m. $Mn^{++}$, 3 ml./dl. soybean protein hydrolyzate, 500 g./l. thiamine hydrochloride, 4% ammonium sulfate, and 1.0% α-aminobutyric acid. Its pH was adjusted to 7 with aqueous ammonia. 20 milliliter batches of the solution were placed in 500 ml. shaking flasks, and were sterilized by steam in the flasks at 110° C. for 6 minutes. They were then inoculated with *Arthrobacter citreus* 23–A.X–4 (ATCC No. 21040), which had been previously cultured on yeast-peptone agar slants, whereafter 1 gram calcium carbonate was added to the medium, and the fermentation was carried out at 31° C. under shaking for 72 hours. 3.05 grams per deciliter of L-ornithine and 0.93 gram per deciliter of isoleucine were found in the fermented broth.

The microbial cells and calcium salts were removed from one liter of the broth by filtration, and the pH of the solution was adjusted to 2.0 with concentrated hydrochloric acid. The acid solution was passed over a column packed with a cation exchange resin of the ammonium type. The column was washed with water, and the L-ornithine absorbed by the resin was eluted from the column with 2 N-ammonium hydroxide solution. The eluate was concentrated, and 20.3 crystals of crude L-ornithine were precipitated by cooling as in Example 1. Its purity was 92.5%.

The pH of the effluent during absorption of the L-ornithine was adjusted to 1.5 with concentrated hydrochloric acid, and the solution was passed over a column packed with a cation exchange resin of the ammonium type. The column was washed with water and the L-isoleucine absorbed by the resin was eluted from the column with 2 N-ammonium hydroxide solution. The eluate was concentrated, and 5.9 g. crystals of crude L-isoleucine were were precipitated from the solution. Its purity was 78.5%.

The strains referred to herein by ATCC numbers are available from the American Type Culture Commission in Washington, D.C., and additional auxotrophic mutant strains will readily be developed by those skilled in the art from the parent strain.

We claim:

1. A method of producing an amino acid which comprises:
    (a) culturing an auxotrophic mutant strain of *Arthrobacter citreus* 23–2A (ATCC No.17775) on an aqueous nutrient medium under aerobic conditions until L-ornithine accmulates in said medium,
        (1) said strain requiring citrulline or arginine for the growth thereof, and
        (2) said medium including an assimilable carbon source, and assimilable nitrogen source, an organic nutrient, essential inorganic ions, and citrulline or arginine; and
    (b) recovering said L-ornithine from said medium.

2. A method as set forth in claim 1, wherein said citrulline or arginine is present in said medium in an amount of 10 to 100 milligrams per deciliter.

3. A method as set forth in claim 1, wherein said mutant strain is the strain 23–2A.X.–4.

4. A method as set forth in claim 1, wherein said medium includes α-aminobutyric acid, whereby L-isoleucine is accumulated together with said L-ornithine, and said L-isoleucine is recovered from said medium.

5. A method as set forth in claim 4, wherein said α-aminobutyric acid is present in said medium in an amount of 0.5 percent to 3 percent by weight.

References Cited

Chemical abstracts, vol. 67, No. 63002f, 1967.

A. LOUIS MONACELL, Primary Examiner

GARY M. NATH, Assistant Examiner

U.S. Cl. X.R.

195—47